(12) United States Patent
Sulser et al.

(10) Patent No.: US 9,505,861 B2
(45) Date of Patent: Nov. 29, 2016

(54) COMB POLYMERS WITH DELAYED ALKALINE HYDROLYSIS

(75) Inventors: Ueli Sulser, Unterengstringen (CH); Jörg Zimmermann, Winterthur (CH); Lukas Frunz, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 295 days.

(21) Appl. No.: 14/131,938

(22) PCT Filed: Aug. 31, 2012

(86) PCT No.: PCT/EP2012/067031
§ 371 (c)(1),
(2), (4) Date: Jan. 10, 2014

(87) PCT Pub. No.: WO2013/034505
PCT Pub. Date: Mar. 14, 2013

(65) Prior Publication Data
US 2014/0163161 A1 Jun. 12, 2014

(30) Foreign Application Priority Data

Sep. 6, 2011 (EP) .................................... 11180192

(51) Int. Cl.
| | | |
|---|---|---|
| *C08F 220/06* | (2006.01) | |
| *C04B 24/26* | (2006.01) | |
| *C08F 216/14* | (2006.01) | |
| *C08F 220/36* | (2006.01) | |
| *C04B 103/40* | (2006.01) | |

(52) U.S. Cl.
CPC ......... *C08F 220/06* (2013.01); *C04B 24/2647* (2013.01); *C08F 216/1416* (2013.01); *C08F 220/36* (2013.01); *C04B 2103/408* (2013.01)

(58) Field of Classification Search
CPC ..................... C04B 24/2647; C04B 2103/408; C08F 216/1416; C08F 220/06; C08F 220/36
USPC ............ 525/329.7, 330.1; 524/558; 560/224; 568/679
See application file for complete search history.

(56) References Cited

U.S. PATENT DOCUMENTS

2009/0163622 A1 6/2009 Albrecht et al.

FOREIGN PATENT DOCUMENTS

| | | |
|---|---|---|
| DE | 10 2005 061 153 A1 | 6/2007 |
| EP | 1 138 697 B1 | 11/2003 |
| EP | 1138697 * 11/2003 | ................ C08F 8/00 |
| JP | S59-161407 A | 9/1984 |
| JP | H03-163109 A | 7/1991 |
| JP | 2000-197357 A | 7/2000 |
| JP | 2009-242197 A | 10/2009 |
| WO | WO 2010/029117 A2 | 3/2010 |
| WO | 2011/102442 A1 | 8/2011 |

OTHER PUBLICATIONS

International Search Report issued in International Patent Application No. PCT/EP2012/067031 dated Oct. 5, 2012.
Office Action issued Jun. 28, 2016 in Japanese Patent Application No. 2014-528939.

* cited by examiner

*Primary Examiner* — Ling Choi
*Assistant Examiner* — Chun-Cheng Wang
(74) *Attorney, Agent, or Firm* — Oliff PLC

(57) ABSTRACT

Comb polymers having carboxyl/carboxylate and ester groups, containing a) 0.1-0.9 mol fractions of a partial structural unit S1, which is derived from an acrylic/methacrylic or maleic acid unit, b) 0-0.4 mol fractions of a partial structural unit S2, which is derived, for example, from an acrylic/methacrylic or maleic acid unit, which is esterified by means of a $C_1$ to $C_{20}$-alkanol or a polyalkylene glycol, alkyl-capped on one end, preferably a polyethylene glycol, and c) 0.1-0.4 mol fractions of a partial structural unit S3, which is derived from an acrylic/methacrylic or maleic acid unit, which is esterified by means of a polyalkylene glycol monoalkyl ether, which has a terminal, secondary hydroxyl group of the form-$CH(R^3)OH$, wherein $R^3$ is bulky alkyl group, preferably a methyl group.

23 Claims, No Drawings

COMB POLYMERS WITH DELAYED ALKALINE HYDROLYSIS

TECHNICAL FIELD

The invention relates to comb polymers as dispersants for mineral binders as well as intermediate products for producing such comb polymers. In addition the invention relates to a composition containing a comb polymer and a mineral binder. The invention further relates to a method for producing comb polymers as well as various uses for comb polymers in conjunction with mineral binders.

PRIOR ART

Dispersants are important additives for binder compositions used in the construction industry, for example concrete, mortar, cement, gypsum and lime; they act as liquefiers or water-reducing agents. The use of such dispersants has long been known. Such liquefiers or dispersants are generally organic polymers, which are added to the mixing water or added as solids to the binder compositions. The consistency of the composition before setting is thereby modified in an advantageous manner. Specifically, the yield point and the viscosity are reduced, improving the workability. The reduction in the water fraction improves the strength of the fully cured binder composition.

Dispersants used include, among others, comb polymers prepared from α,β-unsaturated mono- and polycarboxylic acids with polyalkylene side chains—so-called superliquefiers. Corresponding compounds are described, for example, in EP 1 138 697 B1 (Sika AG).

Binder compositions containing such comb polymers often exhibit the desired low initial viscosity. However, in some instances the viscosity increases markedly after only a short time, which limits the time window for working with the binder composition. Longer workability times are desirable or even necessary for many applications.

To increase the workability time or to achieve prolonged workability (slump life), numerous methods have been recommended and special additives and polymers have been developed, which can be added to binder compositions. Many of these measures are complicated to set up, time-consuming to use, too expensive, or unsatisfactory in terms of the liquefying effect.

Therefore the need still exists for alternative dispersants that do not have the aforementioned drawbacks.

DESCRIPTION OF THE INVENTION

Therefore the object of the present invention is to provide a dispersant which has a good liquefying effect and also permits the longest possible workability times for binder compositions. The dispersant should particularly be usable in concrete or mortar compositions. An additional object is that of creating a manufacturing process for such dispersants.

Surprisingly it was found that a comb polymer according to claim 1 can solve this problem. The comb polymer according to the invention makes possible a water reduction in hydraulically setting compositions comparable to that of conventional comb polymers with a simultaneously considerable increase in workability time or improved long-term workability.

This is especially attributable to the partial structural unit S3 present in the comb polymer. This special partial structural unit is obtainable in particular by esterification of carboxyl groups with a polyalkylene glycol monoalkyl ether which has a terminal, sterically hindered secondary hydroxyl group of the form —CH(R$^3$)OH.

Because of the bulky R$^3$ group, the ester group formed in this way has greater stability against hydrolysis in alkaline medium and in mineral binder compositions, respectively. This in turn leads to a longer lasting dispersion effect, which in turn results in improved long-term workability of the mineral binder.

The problem relating to the manufacturing process is solved by the independent process claims. Additional aspects of the invention are the subject matter of additional independent claims. Particularly preferred embodiments of the invention are the subject matter of the dependent claims.

METHODS OF PERFORMING THE INVENTION

A first aspect of the invention relates to a comb polymer comb polymer KP comprising or consisting of:

a mole fractions of a partial structural unit S1 of formula I,

b mole fractions of a partial structural unit S2 of formula II,

c mole fractions of a partial structural unit S3 of formula III,

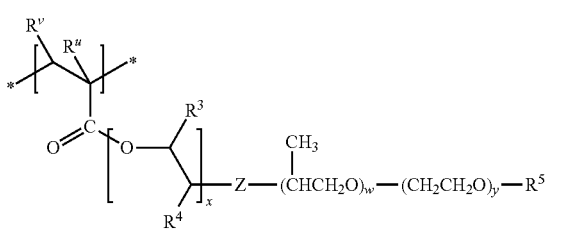

wherein
each M, independently of one another, represents H$^+$, an alkali metal ion, an alkaline earth metal ion, an equivalent of a divalent or trivalent metal ion, an ammonium ion or an organic ammonium group, each $R^u$, independently of one another, represents hydrogen or a methyl group, each $R^v$, independently of one another, represents hydrogen or COOM, each $R^1$, independently of one another, represents a $C_1$- to $C_{20}$-alkyl, -cycloalkyl, -alkylaryl or -$[AO]_n$—$R^2$, wherein A=$C_2$- to $C_4$-alkylene, $R^2$=$C_1$- to $C_{20}$-alkyl, -cyclohexyl or alkylaryl;

and n=2-300, each $R^3$, independently of one another, represents a $C_1$- to $C_5$-alkyl group, preferably a methyl, ethyl or isopropyl group, each $R^4$, independently of one another, represents hydrogen, a $C_1$- to $C_5$-alkyl group, preferably hydrogen, each $R^5$, independently of one another, represents an alkyl group with 1-20 carbon atoms or an alkylaryl group with 7-20 carbon atoms, each Z, independently of one another, represents oxygen or N—$R^6$, wherein $R^6$ represents hydrogen, an alkyl group with 1-20 carbon atoms or an alkylaryl group with 7-20 carbon atoms, x has the values of 1-4, y has the values of 2-250, w has the values of 0-5, and wherein a, b, c, represent the mole fractions of the respective partial structural units S1, S2 and S3, with the mole fraction ratio a/b/c=(0.1-0.9)/(0-0.4)/(0.1-0.9), especially a/b/c=(0.4-0.8)/(0-0.25)/(0.1-0.4), particularly a/b/c=(0.4-0.8)/(0.05-0.25)/(0.1-0.4), and with the proviso that a+b+c=1.

The sequence of the partial structural units S1, S2 and S3 can be alternating, in block sequence or random. In addition it is also possible that in addition to the partial structural units S1, S2 and S3, additional partial structural units are present.

If M is an organic ammonium group, this is especially derived from alkylamines or from C-hydroxylated amines, especially from hydroxy lower alkylamines, such as ethanolamine, diethanolamine or triethanolamine.

Preferably, the partial structural units S1, S2 and S3 together make up a weight fraction of at least 50% by weight, especially at least 90% by weight, particularly preferably at least 95% by weight, based on the total weight of the comb polymer KP. Also preferably a total number of the atoms present in the partial structural units S1, S2 and S3 together accounts for at least 50%, especially at least 90%, particularly preferably at least 95%, of all atoms present in the comb polymer KP.

In particular, $R^u$ and $R^v$ present in the comb polymer KP are hydrogen. Thus, the comb polymer KP can be manufactured based on acrylic acid monomers, which is of interest from the economic viewpoint. Furthermore, in the current context such comb polymers have a good liquefying effect and an optimal processing time.

Advantageously, in the radical $R^1$=$[AO]_n$—$R^2$, wherein preferably A is $C_2$-alkylene. In other words, $R^1$ is preferably equal to $(CH_2CH_2O)_n$—$R^2$. Advantageously in such cases n=10-70, especially n=20-30. The radical $R^2$ is especially a $C_1$- to $C_{20}$-aralkyl, preferably $CH_3$.

In an advantageous embodiment $R^3$=$CH_3$, $R^4$=H and $R^5$ is an alkyl group with 1-20 carbon atoms. Preferably, $R^5$=$CH_3$.

According to an advantageous embodiment, Z=N—$R^6$. Here, $R^6$ is specifically an alkyl group with 1-20 carbon atoms. Particularly preferably, $R^6$=$CH_3$.

In addition it has proven advantageous if y=10-70, especially y=20-30. A good liquefying effect is achieved in this way. Furthermore, such comb polymers are usually readily water-soluble.

According to of a preferred embodiment, x=1. This is especially the case when Z=N—$R^6$.

The sequence of the propylene oxide units —CH($CH_3$)$CH_2O$— and the ethylene oxide units —$CH_2CH_2O$— in the partial structural unit S3 basically may be alternating, in block form or random. Preferably, however, the sequence is in block form. In such cases the block with the propylene oxide units immediately follows the structural unit Z. The block with the ethylene oxide units then especially follows the block with the propylene oxide units. In other words, the block with the propylene oxide units is preferably located between the partial structure Z and the block with the ethylene oxide units.

Preferably, y>w. The w/y ratio is preferably 1/50. Especially w/y 3/15. In particular, 2/30≤w/y≤3/30.

According to of a preferred embodiment, w=0. If w>0, w is especially equal to 1-3, particularly 2-3.

The y/x ratio is advantageously in the range of 0.5-250, especially 1-70, preferably 2.5-70, particularly 2.5-30.

The weight-average molecular weight ($M_w$) of the comb polymer KP is especially 5,000-150,000 g/mol, preferably 10,000-100,000 g/mol. The number-average molecular weight ($M_n$) of the comb polymers KP is advantageously 3000-100,000 g/mol, especially 8,000-70,000 g/mol.

In addition a ratio of a/c=10:1-1:1, especially 5:1-1.5:1, has proven advantageous.

The ratio a/(b+c) is also especially equal to 10:1-1:1, particularly 5:1-1.5:1.

In a further aspect, the invention relates to a composition, especially a mortar composition, a concrete composition or a cementitious composition, containing at least one comb polymer KP as described above as well as a mineral binder. The mineral binder is preferably a hydraulic binder, especially cement, preferably Portland cement.

The term "mineral binder" particularly defines a binder that reacts in the presence of water in a hydration reaction to form solid hydrates or hydrate phases. This can, for example, be a hydraulic binder (e.g., cement or hydraulic lime), a latent hydraulic binder (e.g., slag), a pozzolanic binder (e.g., fly ash) or a non-hydraulic binder (gypsum or white lime). A "cementitious binder" here is especially defined as a binder or a binder composition with a fraction of at least 5% by weight, especially at least 20% by weight, preferably at least 35% by weight, specifically at least 65% by weight, of cement clinker. The cement clinker is preferably a Portland cement clinker. In the present context, cement clinker especially refers to ground cement clinker.

In particular, the mineral binder or the binder composition contains a hydraulic binder, preferably cement. Particularly preferred is a cement with a cement clinker fraction of ≥35% by weight. In particular the cement is of the type CEM I, CEM II and/or CEM IIIA (according to Standard EN 197-1). A fraction of the hydraulic binder in the total mineral binder is advantageously at least 5% by weight, especially at least 20% by weight, preferably at least 35% by weight, specifically at least 65% by weight. According to an additional advantageous embodiment, the mineral binder consists of ≥95% by weight of hydraulic binder, especially cement clinker.

However, it may also be advantageous if the binder or the binder composition contains or consists of other binders. These are especially latent hydraulic binders and/or pozzolanic binders. Suitable latent hydraulic and/or pozzolanic binders are, e.g., slag, fly ash and/or silica dust. The binder composition may also contain inert materials such as limestone, quartz flours and/or pigments. In an advantageous embodiment, the mineral binder contains 5-95% by weight, especially 5-65% by weight, particularly preferably 15-35% by weight, of latent hydraulic and/or pozzolanic binders. Advantageous latent hydraulic and/or pozzolanic binders are slag and/or fly ash.

In a particularly preferred embodiment, the mineral binder contains a hydraulic binder, especially cement or cement clinker, and a latent hydraulic and/or pozzolanic binder, preferably slag and/or fly ash. The fraction of the latent hydraulic and/or pozzolanic binder here is particularly preferably 5-65% by weight, particularly preferably 15-35% by weight, while at least 35% by weight, specifically at least 65% by weight, of the hydraulic binder is present.

In the composition, the comb polymer KP particularly has a share of 0.001-10% by weight, especially 0.01-5% by weight, based on the mineral binder.

In addition, the invention relates to an aqueous composition containing at least one comb polymer KP as described above. A fraction of the comb polymer KP, based on the total weight of the aqueous composition, is especially 10-90% by weight, preferably 20-50% by weight.

In a preferred embodiment, the invention provides a comb polymer KP-1, consisting of the partial structural units S1 and S3 with the following properties:
a/c=1/(0.2-3) and b=0,
$R^u$=$R^v$=H, $R^3$=$CH_3$, $R^4$=H, $R^5$=$CH_3$,
M=H or Na
Z represents oxygen and
x=1 to 4, y=20 to 30 and w=0.

In an additional preferred embodiment, the present invention provides a comb polymer KP-2, consisting of the partial structural units S1, S2, and S3 with the following properties:
a/b/c=1/(0.1-1.5)/(0.1-1.5)
$R^u$=$R^v$=H, $R^1$=$(CH_2CH_2O)_nCH_3$, n=23-26
$R^3$=$CH_3$, $R^4$=H and $R^5$=$CH_3$,
M=H or Na
Z represents oxygen and
x=1 to 4, y=20 to 30 and w=0.

In another preferred embodiment, the present invention provides a comb polymer KP-3, consisting of the partial structural units S1 and S3 with the following properties:
a/c=1/(0.2-3) and b=0,
wherein $R^u$=$R^v$=H, $R^3$=$CH_3$, $R^4$=H, and $R^5$=$CH_3$,
M=H or Na
Z=N—$CH_3$,
x=1, y=20 to 30 and w=0.

In an additional, preferred embodiment, the present invention provides a comb polymer KP-4, consisting of the partial structural units S1, S2, and S3 with the following properties:
a/b/c=1/(0.1-1.5)/(0.1-1.5),
wherein $R^u$=$R^v$=H, $R^1$=$(CH_2CH_2O)_nCH_3$ and n=23-26
$R^3$=$CH_3$, $R^4$=H, $R^5$=$CH_3$,
M=H or Na,
Z=N—$CH_3$, and
x=1, y=20 to 30 and w=0.

Additional aspects of the present invention relate to various uses of a comb polymer KP as defined above in conjunction with mineral binders. As has been found, the comb polymers KP are especially suitable for the following uses or purposes:

Use of a comb polymer KP as superplasticizer for mineral binders, especially for hydraulically setting binders, preferably cementitious binders, particularly preferably for Portland cement.

Use of a comb polymer KP in a composition containing a mineral binder for prolonging the processing time. Especially in hydraulically setting binders, preferably cementitious binders, especially Portland cement.

Use of a comb polymer KP in a composition containing a mineral binder to improve the workability. Especially in hydraulically setting binders, preferably cementitious binders, especially Portland cement.

Use of a comb polymer KP as grinding aid for inorganic solids, especially mineral binders or fillers, for example cement, lime, slag and/or gypsum.

In addition, the present invention relates to methods for producing the comb polymers KP.

A first method, also called a "polymer-analogous" method in the following, for producing a comb polymer KP as described above comprises the steps of:

a) providing and/or producing a basic polymer BP containing or consisting of a structural unit of formula IV

wherein
M, $R^u$ and $R^v$ are defined as above, and
m>2, especially m=20-100;

b) esterification of the base polymer BP with a compound of formula V

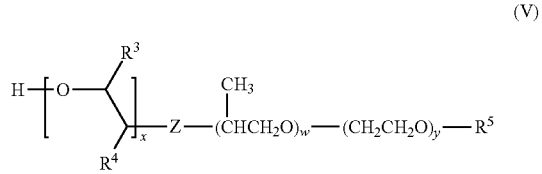

and optionally a compound of formula VI

HO—$R^1$     (VI)

to form the comb polymer KP,
wherein $R^1$, $R^2$, $R^3$, $R^4$, $R^5$, x, y, w and n are defined as in claim 1.

The base polymer BP in step a) is especially a polyacrylic acid, a polymethacrylic acid and/or a copolymer of acrylic acid and methacrylic acid. The number-average molecular weight ($M_n$) of the base polymer BP of formula (I) is preferably 500-20,000 g/mol, especially 500-10,000 g/mol, further preferably 3,000-5,000 g/mol.

Such base polymers BP can be prepared by known methods from acrylic acid monomers and/or methacrylic acid monomers. However, it is also possible, for example, to use maleic acid monomers and/or maleic anhydride monomers. This may be advantageous for economic and safety reasons, among others.

In step a) the base polymer BP is produced especially by aqueous free radical polymerization, for example of acrylic acid and/or methacrylic acid, in the presence of a free radical initiator and/or a molecular weight regulator.

The free radical initiator in step a) is especially Na, K or ammonium peroxodisulfate. Likewise suitable as the free radical initiator in step a) is e.g., a redox couple based on $H_2O_2/Fe^{2+}$.

Preferably the molecular weight regulator in step a) is an alkali sulfite or hydrogen sulfite. Also advantageous is a phosphinic acid derivative. The molecular weight regulator in step a) can also be an organic compound containing a thiol group.

Suitable base polymers BP basically may also be purchased commercially from various suppliers.

For esterification in step b), among others, acids and/or bases may be added, for example as catalysts. The esterification advantageously takes place at elevated temperatures of 120-200° C., especially 160-180° C. In this way the yields can be improved significantly.

The compounds of formula V with Z=oxygen used in step b) are commercially available (e.g., from Sigma-Aldrich Chemie GmbH, Switzerland) or can be produced in known ways by addition of propylene oxide to a polyethylene oxide $R^5$-end-capped on one end. The $R^5$-end-capped polyethylene oxide in turn can be obtained in a known way by addition of ethylene oxide units to an alcohol of formula HO—$R^5$.

For producing compounds of formula V with Z=N—$R^6$, an $R^5$-end-capped polyethylene oxide can be reacted with ammonia or a compound of formula $H_2N$—$R^6$, for example in the presence of hydrogen and/or a metal catalyst at elevated temperature. In this manner a terminal OH-group is converted to a terminal amino group with $R^6$ substituent. Some corresponding polyether amines are also commercially available, e.g., under the trade name of Jeffamine (Huntsman Corporation, USA). Next, a known reaction with propylene oxide is conducted to produce compound V.

Also possible is reaction of an $R^5$-end-capped polyethylene oxide with ammonia, in which a terminal amino group is formed from the terminal OH group of the polyethylene oxide. To introduce the radical $R^6$ (if not equal to H) on the terminal amino group, then especially a reaction with an aldehyde of formula H—C(=O)—$R^6$ may be performed. Then, the compound obtained can be reacted, once again in a known way, with propylene oxide to form compound V.

The compounds of formula VI used in step b) are commercially available from various suppliers.

A second method, also called a "copolymerization method" in the following, for producing a comb polymer KP as described above comprises copolymerization of:

a mole fractions of monomer M1 of formula VII

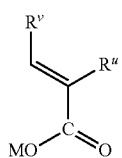

b mole fractions of monomer M2 of formula VIII

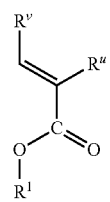

c mole fractions of monomer M3 of formula IX

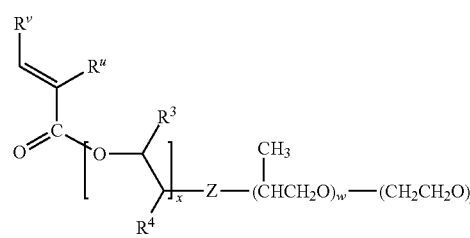

wherein a, b, and c represent the mol fractions of the respective monomers M1, M2 and M3,
a molar ratio a/b/c=(0.1-0.9)/(0-0.4)/(0.1-0.9)
and with the proviso that a+b+c=1,
wherein M, $R^u$, $R^v$, $R^1$, $R^2$, $R^3$, $R^4$, $R^5$, x, y, w and n are defined as above.

The monomers M2 and M3 can be produced in a known manner by esterification of acrylic acid, methacrylic acid, maleic acid and/or maleic anhydride with compounds according to formulas V and VI (cf. above).

The free radical initiators and/or molecular weight regulators mentioned above in connection with the first method may be used for the copolymerization or the second method.

As has been found, the comb polymers produced according to the first method are significantly more effective with regard to prolonging the workability of mineral binder compositions than the corresponding comb polymers produced according to the second method (copolymerization).

In additional aspects, the invention relates to a compound of formula V with Z =N—$R^6$ and a compound of formula IX with Z=N—$R^6$. These compounds can be used as intermediates or starting materials for preparing the comb polymers KP according to the invention in the previously described methods. $R^u$, $R^v$, $R^3$, $R^4$, $R^5$, $R^6$ x, y and where are defined as above. Preferably $R^u$=$R^v$=H, x=1, $R^3$=$CH_3$, $R^4$=H, and/or $R^5$ is an alkyl group with 1-20 carbon atoms. Especially $R^5$=$CH_3$. $R^6$ is especially an alkyl group with 1-20 carbon atoms. Particularly preferably, $R^6$=$CH_3$. According to an advantageous embodiment, y=10-70, especially 20-30, and/or w=0.

EXEMPLARY EMBODIMENTS

1. Measurement Methods

Liquid chromatography measurements were performed with an ACQUITY UPLC from Waters Corporation using ELS and PDA detectors as well as a BEH 300 C18, 2.1×100 mm, 1.7 μm column with 0.15% formic acid as mobile phase A and acetonitrile as mobile phase B.

Molecular weight determinations were performed by gel permeation chromatography (CPC) with aqueous eluants. A narrowly calibrated sodium polyacrylate standard was used for calibration. The eluant used was a 0.1 M sodium nitrate solution, pH=12. The isocratic flow rate was 0.8 ml/min. IGPC column: Varian Ultrahydrogel 7.8×300 mm. The peaks were quantitated with a Varian RI-4 differential refractometer and a Waters SAT/IN-module UV detector.

2. Materials Used

The following starting materials, among others, were used for producing the polymers:

SOKALAN PA 25CL PN: about 50%, partially neutralized polyacrylic acid in water. Average molecular weight $M_w$=4000 g/mol. The product is commercially available from BASF (Germany).

MPEG 1000: Polyethylene glycol monomethyl ether with average molecular weight 1000 g/mol. Ethylene oxide (EO) content: 23 to 26 EO groups/mol.

RMB 5090: A monomethyl polyethylene glycol end-capped with 1 to 4 oxypropylene units with an average molecular weight of about 1000 g/mol and an EO content of 23 to 26 EO groups/mol. RMB 5090 is a product of the INEOS company.

PEA1065: An N-(polyoxyethylene)-N-(methyl)-amino alcohol of average molecular weight of about 1065 g/mol of formula X

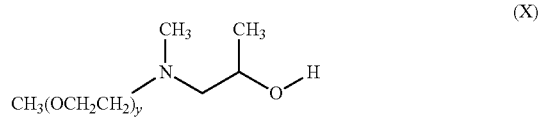

with y=23 to 26.

PEA 1065 is an experimental product. The preparation is performed in that MPEG 1000 is reacted methylamine in the presence of hydrogen and a metal catalyst at elevated temperature and elevated pressure to form polyether amine and this is then reacted with one mole of propylene oxide.

IRGANOX 1010: A stabilizer for polyalkylene glycols, available from Ciba Specialty Chemicals (Switzerland).

RONGALIT: Na-hydroxymethane-sulfinate. Available from BASF (Germany).

3. Examples for the Preparation of Comb Polymers 3.1 KP-1 (Polymer-Analogous Esterification)

Comb polymer KP-1, consisting of partial structural units S1 and S3 in a molar ratio of about 1/0.57, produced by polymer-analogous esterification of a polyacrylic acid with a molecular weight of about 4000 g/mol with RMB 5090. Degree of esterification: 36.5%, based on carboxyl groups.

A 2 liter, 4-neck round-bottom flask with mechanical stirrer, thermometer, gas inlet tube and distillation apparatus was charged with 320 g of SOKALAN PA 25 CL-PN (corresponding to about 2 mol carboxyl groups), 8 g of 50% sulfuric acid, 14 g of p-toluenesulfonic acid and 0.4 g of IRGANOX 1010. After heating to 50° C., 800 g (about 0.730 mol) of RMB 5090 were now added rapidly and the mixture heated within 45 minutes under nitrogen to 165° C. and held for 30 minutes at 165° C. Then, 8 g of 50% sodium hydroxide is added and then the temperature increased to 180° C. while simultaneously applying a vacuum of 80 mbar, whereupon a homogeneous reaction mixture formed. This reaction solution was then held for 4 hours at 180° C., while the internal pressure dropped to 70 mbar. Then, the temperature was held at 180° C. for an additional 3 hours and the progress of the reaction followed by liquid chromatography, wherein the reaction conversion remained constant after reaching 91.5%.

After cooling to 90° C., 600 g of the melt was converted to a clear solution by adding it into into 900 g of water with stirring. Solids content: 39.9%.

3.2 KP-2 (Polymer-Analogous Esterification)

Comb polymer KP-2, consisting of partial structural units S1, S2 and S3 in the molar ratio of about 1/0.30/0.30, produced by polymer-analogous esterification of a polyacrylic acid with a molecular weight of about 4000 g/mol with MPEG 1000 (0.36 mol) and RMB 5090 (0.36 mol). Degree of esterification: 36.5% based on carboxyl groups.

A 2 liter, 4-neck round-bottom flask with mechanical stirrer, thermometer, gas inlet tube and distillation apparatus was charged with 320 g of SOKALAN PA 25 CL-PN (corresponding to about 2 mol of carboxyl groups), 8 g of 50% sulfuric acid, 14 g of p-toluenesulfonic acid and 0.4 g of IRGANOX 1010. After heating to 50° C., 360 g (about 0.36 mol) of MPEG 1000 and 400 g (about 0.36 mol) of RMB 5090 were added rapidly and the mixture heated within 45 minutes under nitrogen to 165° C. and held for 30 minutes at 165° C. Then, 8 g of 50% sodium hydroxide were added, and then the temperature raised to 180° C. with simultaneous application of a vacuum of 80 mbar, whereupon a homogeneous reaction mixture formed. This reaction solution was now held for 3.5 hours at 180° C., during which time the internal pressure dropped to 70 mbar. Then, the temperature was held for an additional 3 hours at 180° C. and the progress of the reaction monitored by liquid chromatography, wherein the reaction conversion remained constant after reaching 92%.

After cooling to 90° C., 600 g of the melt was converted into a clear solution with a polymer content of 92% by adding it into into 900 g of water with stirring. Solids content: 40.2%.

3.3 KP-3 (Polymer-Analogous Esterification)

Comb polymer KP-3, consisting of partial structural units S1 and S3 in a molar ratio of about 1/0.57, produced by polymer-analogous esterification of a polyacrylic acid with a molecular weight of about 4000 g/mol with PEA 1065. Degree of esterification: 36.5%, based on carboxyl groups.

A 2 liter, 4-neck, round-bottom flask with mechanical stirrer, thermometer, gas inlet tube and distillation apparatus was charged with 320 g of SOKALAN PA 25 CL-PN (corresponding to about 2 mol carboxyl groups), 8 g of 50% sulfuric acid, 14 g of p-toluenesulfonic acid and 0.4 g of IRGANOX 1010. After heating to 50° C., 775 g (about 0.73 mol) of PEA1065 were now added quickly and the mixture heated under nitrogen to 165° C. within 45 minutes and held for 30 minutes at 165° C. Then, the temperature was increased to 180° C. while simultaneously applying a vacuum of 80 mbar, whereupon a homogeneous reaction mixture formed. This reaction solution was then held for 3 hours at 180° C., during which time the internal pressure dropped to 70 mbar. Then, reaction was continued for another 2 hours at 180° C. and the progress of the reaction followed by liquid chromatography; wherein the reaction conversion remained constant after reaching 91%.

After cooling to 90° C., 600 g of the melt was converted to a clear solution by adding it into into 900 g of water with stirring. Solids content: 40%.

3.3 KP-4 (Polymer-Analogous Esterification)

Comb polymer KP-4, consisting of partial structural units S1, S2 and S3 in a molar ratio of about 1/0.29/0.29, produced by polymer-analogous esterification of a polyacrylic acid with a molecular weight of about 4000 g/mol with MPEG 1000 (0.4 mol) and PEA 1065 (0.4 mol). Degree of esterification: 36.5%, based on carboxyl groups.

A 2 liter, 4-neck round-bottom flask with mechanical stirrer, thermometer, gas inlet tube and distillation apparatus was charged with 320 g of SOKALAN PA 25 CL-PN (corresponding to about 2 mol of carboxyl groups), 8 g of 50% sulfuric acid, 14 g of p-toluenesulfonic acid and 0.4 g of IRGANOX 1010. After heating to 50° C., 360 g (about 0.36 mol) of MPEG 1000 and 383 g (about 0.36 mol) of PEA 1065 were added rapidly and the mixture heated within 45 minutes under nitrogen to 165° C. and held for 30 minutes at 165° C. Then, the temperature is increased to 180° C. while simultaneously applying a vacuum of 80 mbar, whereupon a homogeneous reaction mixture formed. This reaction solution was now held for 3.5 hours at 180° C., while the internal pressure dropped to 70 mbar. Then, the temperature was held for an additional 2 hours at 180° C. and the progress of the reaction followed by liquid chromatography, wherein the reaction conversion remained constant after reaching 92%.

After cooling to 90° C., 600 g of the melt was converted to a clear solution with a polymer content of 92% by adding it into 900 g of water with stirring. Solids content: 40%.

3.5 Comb Polymer KP-5 (Copolymerization)

Comb polymer KP-5, consisting of partial structural units S1 and S3 in a molar ratio of about 1/0.57, produced by free radical copolymerization of acrylic acid (1.27 mol) and RMB 5090-acrylate (0.75 mol).

1) Monomer Mixture 1

Preparation of a monomer mixture of acrylic acid and RMB5090-acrylate.

| Batch 1: | RMB 5090 | 800 g (0.75 mol) |
|---|---|---|
| | Acrylic acid | 144 g (2 mol) |
| | p-toluenesulfonic acid | 15 g |
| | Phenothiazine | 0.5 g |
| | Toluene | 350 g |

A 2 liter, 3-neck round-bottom flask with stirrer, thermometer and water separator was charged with the entire batch 1 and heated to 126° C. within 30 minutes. Then, the temperature of the esterification mixture was increased to 130° C. within 35 minutes and this temperature maintained under gentle reflux for 12.5 hours until no further water was separated (total 14.5 ml). Using HPLC, a final content of the monomer mixture of 95% ester, based on RMB 5090, was determined.

2) Copolymerization to Form Comb Polymer KP-5

Starting mixture 1: 200 g of water
  6 g of hydrogen peroxide (35%)
Feed 1: 320 g of monomer mixture 1
  80 g of water
  3 g of Rongalit
  0.1 g of iron-Op-sulfate heptahydrate A 1 liter, 3-neck glass flask with thermometer and stirrer was charged with starting mixture 1 at room temperature and feed 1 was added over 60 minutes using a metering pump, wherein the temperature increased from 21° C. to 41° C.

Then, stirring was continued for 30 minutes and then the reaction product was placed in a separatory funnel. The upper phase (toluene) was separated and the lower aqueous phase freed from remaining toluene on a rotary evaporator.

An aqueous solution of the comb polymer KP-5 was obtained and was adjusted to a solids content of 40% by addition of water.

3.6 Comparison Example V1

Comb polymer V1, consisting of partial structural units S1 and S2 in a molar ratio of about 1/0.57, produced by polymer-analogous esterification of a polyacrylic acid having a molecular weight of about 4000 g/mol with MPEG 1000. Degree of esterification: 43%, based on carboxyl groups.

A 2 liter, 4-neck, round-bottom flask with mechanical stirrer, thermometer, gas inlet tube and distillation apparatus was charged with 320 g of SOKALAN PA 25 CL-PN (corresponding to about 2 mol of carboxyl groups), 8 g of 50% sulfuric acid, 14 g p-toluenesulfonic acid and 0.4 g of IRGANOX 1010. After heating to 50° C., 860 g (about 0.86 mol) of MPEG 1000 were added and the mixture was heated to 165° C. within 45 minutes under nitrogen and held for 30 minutes at 165° C. Then, 8 g of 50% sodium hydroxide were added and then the temperature increased to 180° C. while simultaneously applying a vacuum of 80 mbar, whereupon a homogeneous reaction mixture formed. This reaction solution was now held at 180° C. for 2 hours, during which time the internal pressure dropped to 70 mbar. Then, reaction was continued for 1.5 hours at 180° C. and the progress of the reaction was monitored by liquid chromatography, wherein the conversion rate remained constant after reaching 92%.

After cooling to 90° C., 600 g of the melt was converted to a clear solution by adding it into 900 g of water with stirring. Solids content: 40.2%.

3.7 Comparison Example V2

40% polyacrylic acid with a molecular weight of about 4000 g/mol in the form of a partially neutralized Na salt.

For this purpose, 100 g of SOKALAN PA 25CL PN were diluted with 25 g of water.

4. Fresh Mortar Experiments 4.1 Preparation of Fresh Mortar Samples

To demonstrate the effectiveness of the comb polymers KP-1 to KP-5 according to the invention, fresh cement mortars all containing the same quantities of 40% solutions of these polymers or comparison polymers were prepared.

Specifically, fresh mortar compositions with the specifications given in Table 1 were prepared.

TABLE 1

| Fresh mortar composition | |
|---|---|
| Ingredient | Quantity in g |
| Portland cement, Type 1 | 1000 |
| Limestone filler | 200 |
| Fine sand, 0-1.2 mm[1] | 1267 |
| Sand, 1.2-4 mm[1] | 1067 |
| Sand, 4-8 mm[1] | 1667 |
| Total water content (water for mixing + water of the polymer solution) | 420 |
| Polymer according to the invention or comparison polymer (40%-solution)[2] | 7 |

[1]Washed and dried
[2]All polymer solutions were defoamed with 0.1% triisobutyl phosphate Filler, sand and cement were mixed for 60 seconds in a Hobart mortar mixer. Then, the 40% polymer solution dissolved in the batching water was added and the mortar machine-mixed for 3 minutes.

4.2 Time-Dependent Slump

The flow behavior of the fresh mortar compositions was determined using a flow table test according to DIN 18555, part 2.

The diameters of the spread-out mortars were measured in two directions and the average taken as the flow value. The measurement process was repeated after 60, 120 and 180 minutes, in each case after 30 seconds of mixing.

The time-dependent degree of flow of the mortar is a measure of its time-dependent workability or the workability time. The consistency of freshly prepared mortar, i.e., the mobility and viscosity are the most important properties for the workability.

Table 2 gives an overview of the time-dependent slump of the various fresh mortar specimens.

TABLE 2

Time-dependent slump of the various fresh mortar specimens. The fraction of polymer here is based on the cement content of the fresh mortar composition. W/Z is the water/cement weight ratio.

| No. | Polymer | W/Z | Polymer fraction [% by weight] | Slump in mm, x minutes after mixing | | | |
|---|---|---|---|---|---|---|---|
| | | | | x = 0 | x = 60 | x = 120 | x = 180 |
| P1 | KP-1 | 0.42 | 0.7 | 210 | 234 | 222 | 180 |
| P2 | KP-2 | 0.42 | 0.7 | 212 | 230 | 200 | 160 |
| P3 | KP-3 | 0.42 | 0.7 | 214 | 240 | 225 | 180 |
| P4 | KP-4 | 0.42 | 0.7 | 205 | 233 | 218 | 165 |
| P5 | KP-5 | 0.42 | 0.7 | 210 | 228 | 200 | 155 |
| P6 | V1 | 0.42 | 0.7 | 206 | 226 | 164 | n.m. |
| P7 | V2 | 0.42 | 0.7 | 171 | n.m. | n.m. | n.m. | n.m. = not measurable, because too viscous

In particular it is apparent from Table 2 that the fresh mortar compositions P1-P5, all of which contain comb polymers according to the invention, remain workable for up to 180 minutes. This is in contrast to samples P6 and P7, which contain conventional polymers.

The best results in these tests are obtained with specimen P3 or comb polymer KP-3 with side chains on the basis of polyoxyethylene-N-(methyl)-amino alcohol (PEA 1065). Comb polymer KP-3 even comes out better than comb polymer KP-1, which has side chains based on oxypropylene end-capped monomethyl polyethylene glycol (RMB 5090).

It is also apparent that in specimens P2 and P4, with the comb polymers KP-2 and KP-4, respectively, the viscosity, especially after 120 and 180 minutes, increases more extensively than in the case of the specimens P1 and P3. This is especially attributable to the smaller number of S3 partial structural units in the comb polymers KP-2 and KP-4. This confirms the relevance of the partial structural units S3 in the comb polymers according to the invention.

It is noteworthy also that the comb polymer KP-5 produced by copolymerization gets somewhat poorer results compared with the comb polymer KP-1 produced by a polymer-analogous method. Polymer-analogously produced comb polymers thus differ from corresponding comb polymers produced by copolymerization.

Since a close correlation exists between the flow behavior of fresh mortar and fresh concrete, the results obtained are essentially transferrable to fresh concrete.

However, the above-described embodiments are merely to be understood as illustrative examples, which can be modified as desired within the scope of the invention.

The invention claimed is:
1. A comb polymer KP comprising:
a mole fractions of a partial structural unit S1 of formula I

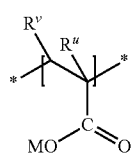

b mole fractions of a partial structural unit S2 of formula II

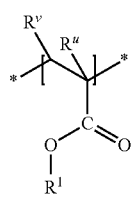

c mole fractions of a partial structural unit S3 of formula III

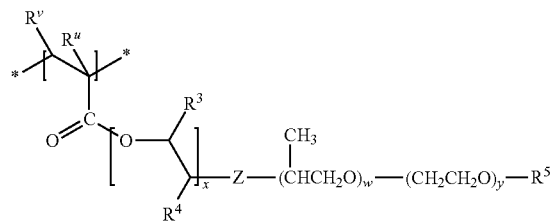

wherein
each M independently of one another represents H$^+$, an alkali metal ion, an alkaline earth metal ion, an equivalent of a divalent or trivalent metal ion, an ammonium ion or an organic ammonium group,
each $R^u$ independently of one another represents hydrogen or a methyl group,
each $R^v$ independently of one another represents hydrogen or COOM,
each $R^1$ independently of one another represents a $C_1$- to $C_{20}$-alkyl,
-cycloalkyl,
-alkylaryl or
-[AO]$_n$-R$^2$,
wherein A=$C_2$- to $C_4$-alkylene, $R^2$=$C_1$- to $C_{20}$-alkyl, -cyclohexyl or alkylaryl;
and n=2-300,
each $R^3$, independently of one another, represents a $C_1$- to $C_5$-alkyl group,
each $R^4$, independently of one another, represents hydrogen, a $C_1$- to $C_5$-alkyl group,
each $R^5$, independently of one another, represents an alkyl group with 1-20 carbon atoms or an alkylaryl group with 7-20 carbon atoms,
each Z, independently of one another, represents oxygen or N—$R^6$, wherein $R^6$ represents hydrogen, an alkyl group with 1-20 carbon atoms or an alkylaryl group with 7-20 carbon atoms,
x has the values of 1-4, y has the values of 2-250,
w has the values of 0-5,
and wherein a, b, and c represent the mole fractions of the respective partial structural units S1, S2 and S3, with the molar ratio
a/b/c=(0.1-0.9)/(0-0.4)/(0.1-0.9),
and the proviso that a+b+c=1.

2. The comb polymer KP according to claim 1, wherein $R^u$ and $R^v$ are hydrogen.

3. The comb polymer KP according claim 1, wherein $R^2=CH_3$ and/or that n=10-70.

4. The comb polymer KP according to claim 1, wherein that $R^3=CH_3$, $R^4=H$ and $R^5=CH_3$.

5. The comb polymer KP according to claim 1, wherein $Z=N-R^6$.

6. The comb polymer KP according to claim 1, wherein y=10-70.

7. The comb polymer KP according to claim 1, wherein the weight-average molecular weight ($M_w$) of the comb polymer KP is 5,000-150,000 g/mol.

8. The comb polymer KP according to claim 1, wherein the ratio a/c=10:1—1:1.

9. A composition, containing at least one comb polymer KP according to claim 1 as well as a mineral binder.

10. A comb polymer KP according to claim 1 as a superplasticizer for mineral binders.

11. A comb polymer KP according to claim 1 in a composition containing a mineral binder to prolong the processing time.

12. A method for producing a comb polymer KP according to claim 1, comprising the steps of:
a) providing and/or producing a base polymer BP comprising a structural unit of formula IV

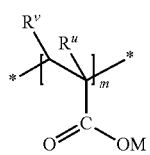
(IV)

wherein
M, $R^u$ and $R^v$ are defined as in claim 1 and m>2;
b) esterification of the base polymer BP with
i) a compound of formula V

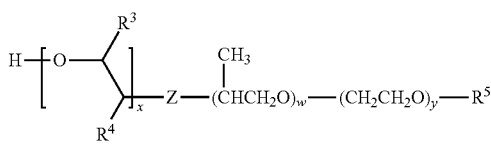
(V)

as well as
ii) optionally a compound of formula VI

 (VI)

to form a comb polymer KP.

13. A method for producing a comb polymer KP according to claim 1, comprising copolymerization of:

a mole fractions of monomer M1 of formula VII

(VII)

b mole fractions of monomer M2 of formula VIII

(VIII)

c mole fractions of monomer M3 of formula IX

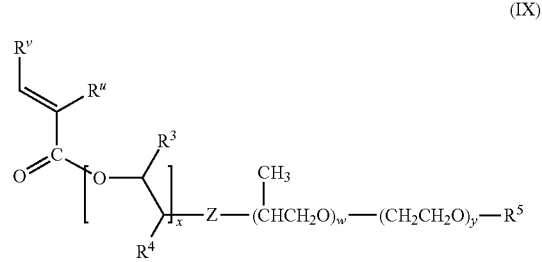
(IX)

wherein a, b, and c are the mole fractions of the respective monomers M1, M2 and M3, and the molar ratio
a/b/c=(0.1-0.9)/(0-0.4)/(0.1-0.9)
and with the proviso that a+b+c=1.

14. A comb polymer KP obtained by the method according to claim 12.

15. A compound of formula V

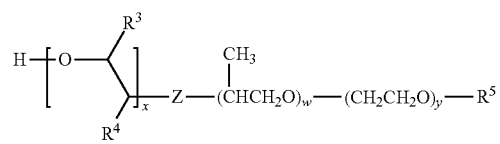
(V)

wherein $Z=N-R^6$ and
each $R^3$, independently of one another, represents a $C_1$- to $C_5$-alkyl group,
each $R^4$, independently of one another, represents hydrogen, a $C_1$- to $C_5$-alkyl group,
each $R^5$, independently of one another, represents an alkyl group with 1-20 carbon atoms or an alkylaryl group with 7-20 carbon atoms,
$R^6$ represents hydrogen, an alkyl group with 1-20 carbon atoms or an alkylaryl group with 7-20 carbon atoms,
x has the values of 1-4,
y has the values of 2-250, and w has the values of 0-5.

16. A compound of formula IX

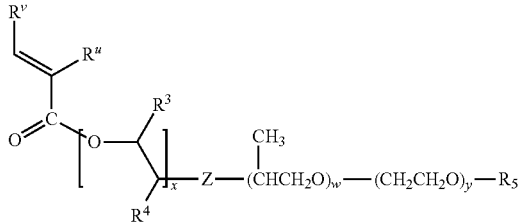

(IX)

wherein Z=N—R$^6$ and each R$^u$ independently of one another represents hydrogen or a methyl group, each R$^v$ independently of one another represents hydrogen or COOM, each R$^3$, independently of one another, represents a C$_1$- to C$_5$-alkyl group, each R$^4$, independently of one another, represents hydrogen, a C$_1$- to C$_5$-alkyl group, each R$^5$, independently of one another, represents an alkyl group with 1-20 carbon atoms or an alkylaryl group with 7-20 carbon atoms, R$^6$ represents hydrogen, an alkyl group with 1-20 carbon atoms or an alkylaryl group with 7-20 carbon atoms, x has the values of 1-4, y has the values of 2-250, and w has the values of 0-5.

17. The comb polymer KP according to claim 1, wherein an y/x ratio is in the range of 1- 70.

18. The comb polymer KP according to claim 1, wherein an y/x ratio is in the range of 2.5-70.

19. The comb polymer KP according to claim 1, wherein an y/x ratio is in the range of 2.5-30.

20. The comb polymer KP according to claim 1, wherein w is in the range of 1-3.

21. The comb polymer KP according to claim 1, wherein the comb polymer consists of partial structural units S1 and S3.

22. The comb polymer KP according to claim 1, wherein the comb polymer consists of partial structural units S1 and S3, and a/c=1(0.2-3) and b=0, R$^u$=R$^v$=H,

R$^3$=CH$_3$,

R$^4$=H,

R$^5$=CH$_3$,

M=H or Na,

Z represents oxygen, y ranges from 20 to 30, and w=0.

23. The comb polymer KP according to claim 1, wherein the comb polymer consists of partial structural units S1, S2, and S3, and a/b/c=1/(0.1-1.5)/(0.1-1.5)

R$^u$=R$^v$=H,

R$^1$=(CH$_2$CH$_2$O)$_n$CH$_3$, n=23-26,

R$^3$=CH$_3$,

R$^4$=H,

R$^5$=CH$_3$,

M=H or Na,

Z represents oxygen, y ranges from 20 to 30, and w=0.

* * * * *